Patented Feb. 19, 1946

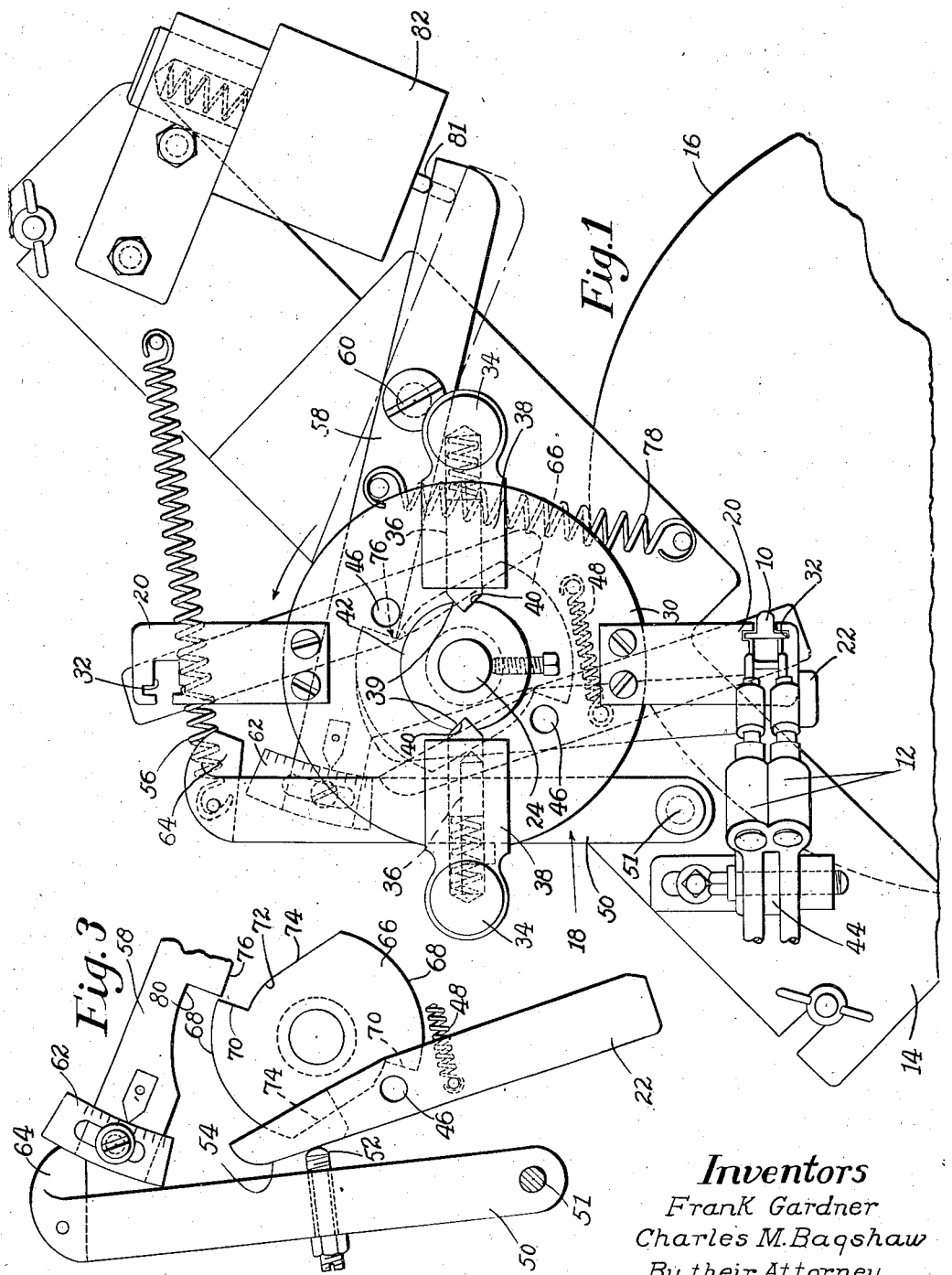

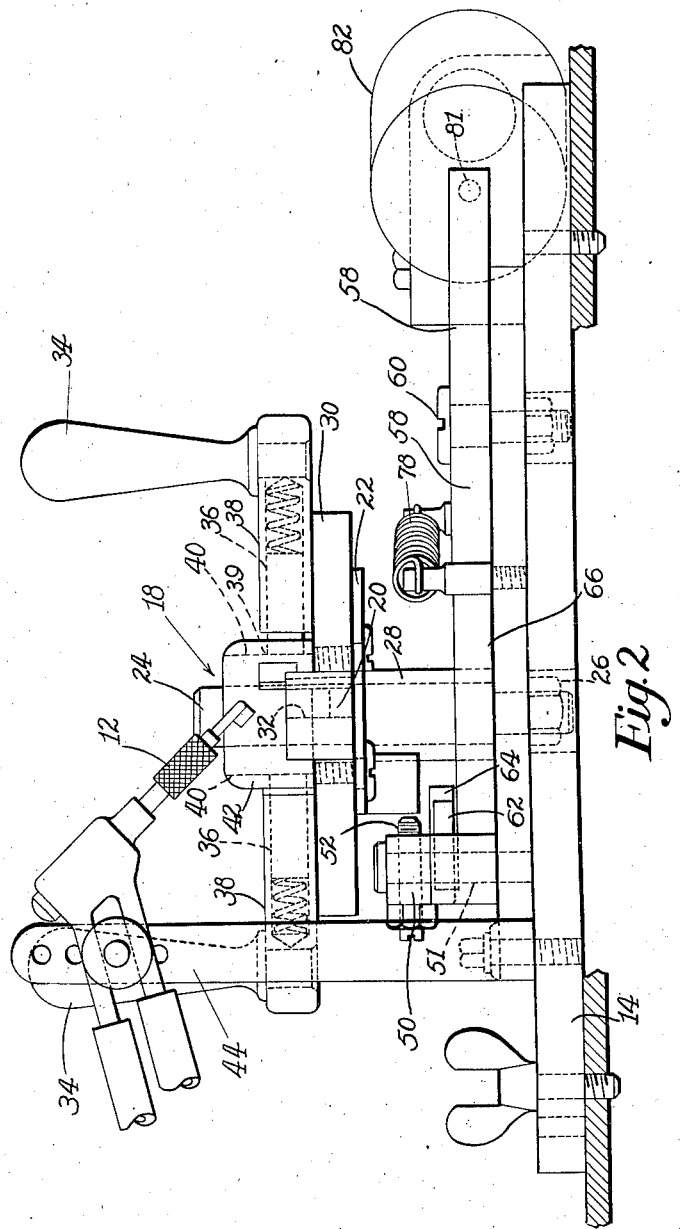

2,395,112

UNITED STATES PATENT OFFICE 2,395,112

WORK HANDLING MECHANISM

Frank Gardner and Charles Martin Bagshaw, Leicester, England, assignors to United Shoe Machinery Corporation, Flemington, N. J., a corporation of New Jersey Application November 11, 1943, Serial No. 509,884 In Great Britain November 11, 1942

7 Claims. (Cl. 29—284)

This invention relates to work handling mechanism, and is herein illustrated as embodied in an apparatus for flame hardening metal parts.

Recently, considerable use has been made of the process for hardening metal parts locally, which consists in applying intense heat to the portions of the parts to be hardened by means such as an oxyacetylene blowtorch, and then quenching the parts. In the employment of this method, the time during which the flame is applied to the portions of the parts to be hardened is critical and must be closely regulated, if uniformity in results is to be obtained. Heretofore, it has been common practice for an operator to observe the color attained by the work piece during heating in determining the extent of heating, with results which are sometimes unsatisfactory due to poor judgment on the part of the operator. Furthermore, the operation is tiring on the operator because of the effect of the light from the flame upon his eyes, it being impractical to wear protective colored glasses when attempting to judge the color of a work piece. In view of the foregoing, it is an object of the present invention to provide an improved work handling mechanism for facilitating the presentation of work pieces to an operating point, and for controlling automatically the time during which the pieces remain at that point.

To this end and as illustrated, the invention provides novel mechanism comprising means for presenting a work piece to an operating point, including a work positioning member and a work supporting member, arranged normally to support the work piece in the positioning member and movable to release the work piece automatically after a predetermined time. Preferably, and as shown, means for moving the supporting member is actuated by mechanism which has a time-lag and which is set in operation upon movement of the work piece to the operating point. This apparatus is advantageous, for example, in that the work piece can be readily located accurately in operative position relatively to a heating unit, and, since the length of time during which the work piece is located in such position is automatically controlled, successive work pieces are heated uniformly with the result that the products obtained are uniform.

These and other features of the invention are shown in the accompanying drawings, described in the following specification, and set forth in the claims.

In the drawings:

Fig. 1 is a plan view of one embodiment of the heating apparatus;

Fig. 2 is a side elevation, partly in section, of the apparatus; and

Fig. 3 is a plan view of a portion of the mechanism for controlling movement of the work supporting members.

The invention is illustrated in connection with the heat treatment of small metal parts, such as a flanged plug 10 (Fig. 1), the flanged portions of which it is desired to harden. The apparatus comprises a heating unit consisting of two oxyacetylene blowtorches 12 mounted upon a base plate 14 extending across a portion of a quenching tank 16, there being a turret 18 having work positioning members 20, which can be brought into operative position relatively to the blowtorches, and a work supporting plate 22 associated with each positioning member and which can be moved at the proper time to drop the work piece into the quenching tank.

The turret 18 comprises a vertical post 24 secured by a nut 26 (Fig. 2) to the base plate 14. Upon the upper end of the post is mounted a sleeve 28, to which is secured a table 30 carrying the two positioning members 20 arranged 180° apart. These members are recessed at 32 to receive work pieces which rest upon the supporting plates 22. On the table, in position midway between the two positioning members, are located two handles 34 by which the table may be rotated about the post. In order to locate the table accurately with the positioning members successively in operative position relatively to the blowtorches, there are provided two spring-pressed plungers 36, slidably mounted in bosses 38 adjacent to the handles and having pointed ends 39, which can be located in notches 40 in a collar 42 secured to the upper end of the post. Thus, when the table is rotated by the handles into a position in which the plungers are engaged in the notches, one or another of the positioning members 20 is located adjacent to the blowtorches.

The blowtorches are adjustably mounted upon a bracket 44 carried by the base plate 14, and are located so that they will direct their flames upon opposite sides of the work piece 10, when positioned in operative relation to them.

Each supporting plate 22 is mounted upon a pivot 46 on the table, and is normally urged by a spring 48 in a counterclockwise direction to maintain the plate in position below the recess in its associated positioning member. Each plate is arranged to be moved to release a work piece at the proper time by a lever 50, pivoted at 51 on the base plate the lever having an adjustable screw 52 for engaging a nose portion 54 on the inner end of the plate 22, and there being a spring 56 urging the lever in a clockwise direction for effecting movement of a plate laterally of a positioning member 20.

The lever 50 is actuated by a trip lever 58, pivoted at 60 on the base plate 14 and having an adjustable graduated plate 62 arranged to engage a latch 64 on the lever 50. The lower portion of the sleeve 28 is provided with a cam 66, which is rotatable with the table 30. The cam has two corresponding cam surfaces, each extending 180° about the axis of the turret. Each cam surface is arranged to engage a nose portion 76 upon the trip lever and through the lever controls the movement of the supporting plate 22 which is disposed upon the opposite side of the post relatively to the cam surface. Each cam surface has a high part 68, a step 70, a circular portion 72, and a rise 74. This arrangement is such that, as the table and cam move in a contraclockwise direction, that high part of the cam 66 which, at the time, is disposed farthest away from the heating unit, engages the nose portion 76 on the lever 58, and is operative during about 45° of revolution of the table 30 to hold the lever stationary against the force of a spring 78 urging it in a contraclockwise direction. When the step 70 is moved beyond the edge of the portion 76 of the trip lever, the latter will be moved in a clockwise direction under the action of the spring to release the latch 64, the high part of the cam being received in a recess 80 in the lever. When the lever 58 is released, the nose portion 76 engages the circular portion 72 of the cam and upon further rotation rides up on the rise 74, which restores the lever to its original position during another 45° of revolution of the table. The parts are so constructed and arranged that the lever 58 is released each time a positioning member 20 is initially brought into operative relation to the blowtorches 12.

In order to control the time of heating of the work piece, the parts are arranged to delay the release of the latch 64, after a work piece has been located in operative position, until a predetermined amount of time has elapsed. To effect this, the lever 58 has its outer end in engagement with a plunger 81 of a time-lag device 82, preferably in the form of a fluid-operated dash pot. This device may be of any suitable type obtainable upon the market, its principal requirement being that the plunger, when subjected to a constant pressure, will move at a predetermined rate, and will be returned to its original position upon release of the pressure. In the present apparatus, when the step 70 of the cam is advanced past the nose portion 76 of the lever 58, as shown in Fig. 3, the spring 78 will force the outer end of the lever against the plunger 81, which acts to retard counterclockwise movement of the plate 62. The time required for movement of the lever prior to releasing the latch is usually of the order of three to six seconds, and can be varied by shifting the position of the plate 62 relatively to the axis of the lever. Wider variations in timing can be obtained by utilizing dash pots having different time-lag factors.

In the operation of the mechanism, the operator places a work piece in the positioning member 20, which is located in the side of the machine away from the quenching tank, then rotates the table through 180° by means of the handles 34 to bring the work piece into operative position relatively to the blowtorches. During movement of the table, the portion 76 of the lever 58 rides along the high part of the cam 66, and then drops off the step 70. The spring 78 urges the lever 58 in a clockwise direction, the movement being retarded by the dash pot 82 for a predetermined time. At the end of this time, the plate 62 releases the latch 64, and the lever 50 under the influence of the spring 56 moves in a clockwise direction and engages the inner end of the plate 22, moving the outer end thereof from beneath the work piece, which then drops by gravity into the quenching tank 16.

Having described our invention, what we claim as new and desire to secure by Letters Patent of the United States is:

1. In mechanism of the character described, a turret, work positioning members carried by the turret, plates normally operable to support work in the positioning members, means for pivotally mounting the supporting plates for movement laterally of the positioning members, a latch carried by the turret, a time-lag device, a lever one end of which is movable into engagement with the time-lag device and the other end of which normally engages the latch, a cam for releasing the latch when the work is located in a predetermined position, and means operable upon release of the latch for moving the latch under control of the time-lag device to effect movement of the supporting plate from beneath the work.

2. In mechanism of the character described, a turret, a plurality of work positioning members carried by the turret, means for moving the turret successively to locate work pieces in a predetermined position, plates positioned beneath each of the positioning members for supporting the work pieces, means mounting the plates for movement laterally of the positioning members, a time-lag device, and means under the control of the time-lag device for moving a plate from beneath its work positioning member subsequent to location of a work piece.

3. Work handling mechanism comprising a turret, a work positioning member mounted upon the turret, a work supporting member associated with the positioning member, a dash pot, and means operable to move the supporting member in a direction to release the work piece at a predetermined time under the control of the dash pot.

4. Work handling mechanism comprising a work positioning member, a work supporting member associated with the work positioning member, means mounting the supporting member for movement laterally of the positioning member, a lever for moving the work supporting member to release work in the positioning member, means for normally holding the lever in inoperative position, means for releasing the lever upon movement of the positioning member into a predetermined position, and means for retarding movement of the lever for a predetermined time after the positioning member is located in the predetermined position.

5. Work handling mechanism comprising a turret, a work positioning member mounted upon the turret and movable therewith, a work supporting member associated with the positioning member and pivotally mounted upon the turret, a lever for effecting movement of the supporting plate about its pivot, a trip lever normally engaging the first-mentioned lever for retaining the same stationary position, a cam carried by the turret, means for maintaining the trip lever in operative engagement with the cam, said cam having a portion effective to hold the trip lever stationary for a portion of the cycle and another portion for releasing the trip lever when a positioning member is located in a predetermined position, and a dash pot for delaying for a predetermined time the operation of the trip lever in releasing the first-mentioned lever.

6. Work handling mechanism comprising a work supporting member movable into position to present a work piece supported thereby into a predetermined position, a control member for actuating the work supporting member to release the work piece, a trip lever normally engaging the control member for holding the latter in inoperative position, means normally operative to hold the trip lever against movement, a dash pot operatively connected to the trip lever for retarding movement of the same upon its release, and means operable when the work piece is moved into the predetermined position for releasing the trip lever.

7. Work handling mechanism comprising a rotatable turret, a work positioning member mounted upon the turret, a work supporting member associated with the positioning member for holding the work piece in the positioning member, means for pivotally mounting the work supporting member for movement to release the work piece, a control member for moving the supporting member, a trip lever engaging the control member normally operative to hold the control member stationary, means for urging the trip lever in a direction to release the control member, means normally operative to hold the trip lever stationary, a time-lag device for retarding movement of the trip lever when it is released, and means for releasing the trip lever upon movement of the positioning device in locating a work piece in a predetermined position.

FRANK GARDNER.
CHARLES MARTIN BAGSHAW.